United States Patent [19]

Fujii et al.

[11] Patent Number: 4,725,091

[45] Date of Patent: Feb. 16, 1988

[54] WINDOW STRUCTURE OF A VEHICLE

[75] Inventors: Hideichi Fujii; Kazuhiko Kawazoe; Yu Saito, all of Kobe; Yoshiki Takahashi, Akashi, all of Japan

[73] Assignee: Kawasaki Jukogyo Kabushiki Kaisha, Japan

[21] Appl. No.: 813,475

[22] Filed: Dec. 26, 1985

[30] Foreign Application Priority Data

Dec. 27, 1984 [JP] Japan ................................ 59-281230

[51] Int. Cl.4 ............................................... B60J 1/10
[52] U.S. Cl. .................................. 296/201; 296/84 A; 296/84 D; 296/203; 105/401; 52/208
[58] Field of Search ............... 296/84 R, 84 A, 84 D, 296/201, 203; 105/401; 52/208, 400, 777, 214

[56] References Cited

U.S. PATENT DOCUMENTS

| | | | |
|---|---|---|---|
| 2,257,035 | 9/1941 | Chaffee | 52/208 |
| 2,386,151 | 10/1945 | Trautvetter | 52/208 |
| 2,407,086 | 9/1946 | Ledwinka et al. | 52/208 |
| 2,469,183 | 5/1949 | Small | 52/400 |
| 2,978,995 | 4/1961 | Dean | 296/201 X |
| 3,323,471 | 6/1967 | Dean et al. | 296/201 X |
| 3,443,346 | 5/1969 | Eggert, Jr. | 52/400 X |
| 3,503,168 | 3/1970 | Eggert, Jr. | 105/401 X |
| 3,759,004 | 9/1973 | Kent | 52/400 |
| 4,462,629 | 7/1984 | Todori et al. | 296/203 X |
| 4,591,203 | 5/1986 | Furman | 296/201 |

Primary Examiner—Dennis H. Pedder
Attorney, Agent, or Firm—Leydig, Voit & Mayer

[57] ABSTRACT

A window structure for a vehicle body includes upper and lower frame members, right and left side pillar members and corner members formed integrally with the vehicle body, defining a window opening portion. A projecting edge is integrally formed with the upper and lower frame members, right and left side pillar members and corner members over an entire circumference of the window opening portion. An inner wall is formed at an inner periphery of the peripheral edge of the window opening portion. The inner wall has a groove along the entire circumference thereof. A glass retainer is implanted in the groove. A seal rubber is positioned between the glass retainer and the projecting edge. With such an arrangement, the peripheral edges of the surfaces of a window glass are pressingly clamped between the glass retainer and the projecting edge through the seal rubber, thereby providing sufficient rigidity and mechanical strength against various loads imposed to the window structure.

8 Claims, 14 Drawing Figures

FIG. 8
PRIOR ART
FIG. 9
PRIOR ART
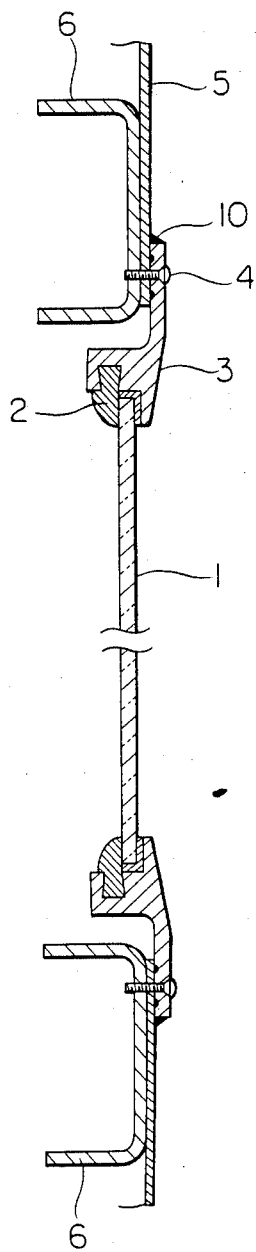
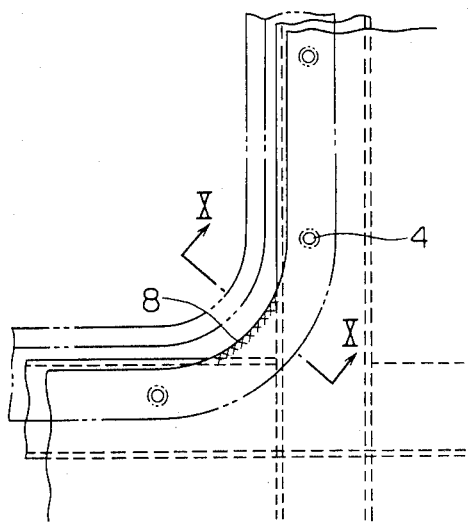

4,725,091

WINDOW STRUCTURE OF A VEHICLE

BACKGROUND OF THE INVENTION

The present invention relates to a window structure of a vehicle, and more particularly to a window structure for a railway car, in which a window glass is adapted to be applied to a window opening portion of a body composed of upper and lower frame members, right and left pillar members and corner members.

In railway cars, since a window opening portion of a vehicle body is subjected to various forces which cause strains at the window opening portion due to distribution loads imposed on a vehicle body floor, machine loads under the body floor, body end loads imposed on connecting means, reaction forces from chassis to frame members and the like, it is necessary to construct the window opening portion to have rigidity and mechanical strength enough to withstand these forces.

In the conventional window opening portion of the vehicle body, as shown in FIGS. 7 and 8, a window frame assembly having a glass 1 fitted in and along a frame body 3 through a glass seal rubber 2 is mounted by mounting screws 4 through a vehicle body outer panel 5 onto upper and lower frame members 6 and right and left side pillar members 7 which constitute the vehicle body window opening portion. Accordingly, when various loads imposed to the vehicle body are applied to the opening portion constituting components such as the upper and lower frame members 6 and right and left side pillar members 7, although the opening portion constituting components share parts of the imposed loads, the imposed loads are substantially applied to corner outer panel portions 8 as best shown in FIG. 9. As a result, strains are generated at the corner outer panel portions 8. To eliminate the strains, as shown in FIGS. 11 and 12, attempt is made to provide corner reinforcing members 9 at the corner outer panel portions 8, thereby obtaining satisfactory rigidity and mechanical strength over the entire window opening portion as well as at the corner outer panel portions 8.

On the other hand, in order to maintain a water- and air-tight effect of the vehicle body interior and to ensure the seal effect for sealing the outer peripheral edges of the frame body 3 against the vehicle body outer panel 5 with seal members 10, it is necessary to shorten an interval of the mounting screws 4 of the frame body 3 as shown in FIGS. 13 and 14. Therefore, screw seats 11 for the mounting screws 4 must be provided inside of the corner outer panel portions. Such an arrangement is intricate.

Furthermore, in the conventional arrangement, it is very complicated to perform maintenance work on the seal portion, for example, the seal members 10 may be damaged when working between the frame body 3 and the vehicle body outer panel 5. Thus, the conventional arrangement suffers from various disadvantages.

SUMMARY OF THE INVENTION

An object of the present invention is to overcome the above-noted various disadvantages inherent in the conventional arrangement in which a window frame assembly is mounted onto a window opening portion of a vehicle body by mounting screws.

This and other objects are attained by providing a novel window structure in which window glass retaining members are integrally formed with upper and lower frame members, right and left side pillar members and corner members which constitute a window opening portion, and inner and outer edge portions of the window glass are clamped by the retaining members. In other words, according to the invention, such a structure is adopted that no conventional screws are used and the glass retaining members also serve to reinforce the window opening portion, whereby the window opening portion has rigidity and mechanical strength that may withstand sufficiently various loads transmitted thereto from the vehicle body. At the same time, this makes it possible to considerably simplify the assembly of the window structure.

BRIEF DESCRIPTION OF THE DRAWING

In the accompanying drawings:

FIG. 8 is a cross-sectional view taken along the line VIII—VIII of FIG. 7;

FIG. 9 is an enlarged view of a corner portion shown in FIG. 7;

DETAILED DESCRIPTION OF THE PREFERRED EMBODIMENTS

Figure 1:
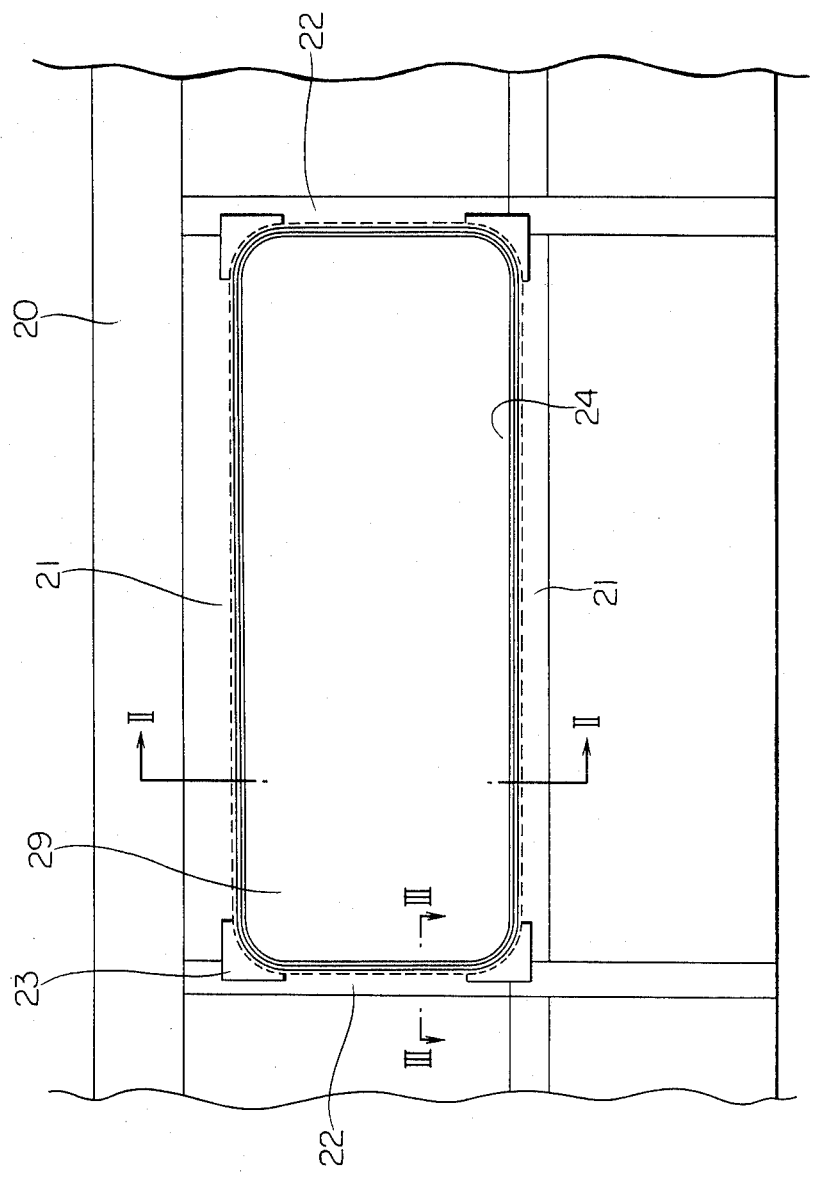
FIG. 1 is an inside view of a window structure according to the present invention.

The present invention will now be described with reference to the accompanying drawings.

In FIGS. 1 to 5, a vehicle body, generally designated by reference numeral 20, includes a window opening portion 24 composed of upper and lower frame members 21, right and left side pillar members 22 and corner members 23 which are integrally formed with the vehicle body 20.

Along one side peripheral edge, that is, a peripheral edge confronting the outside, of the above-described window opening portion 24, there is formed a projecting edge 26 normal to an inner circumferential wall 25 of the window opening portion 24.

The above-described projecting edge 26 includes lateral edge forming pieces 21a integrally formed with the upper and lower frame members 21, longitudinal edge forming pieces 22a integrally formed with the right and left side pillar members 22 and corner edge forming pieces 23a integrally formed with the corner members 23.

Figure 2:
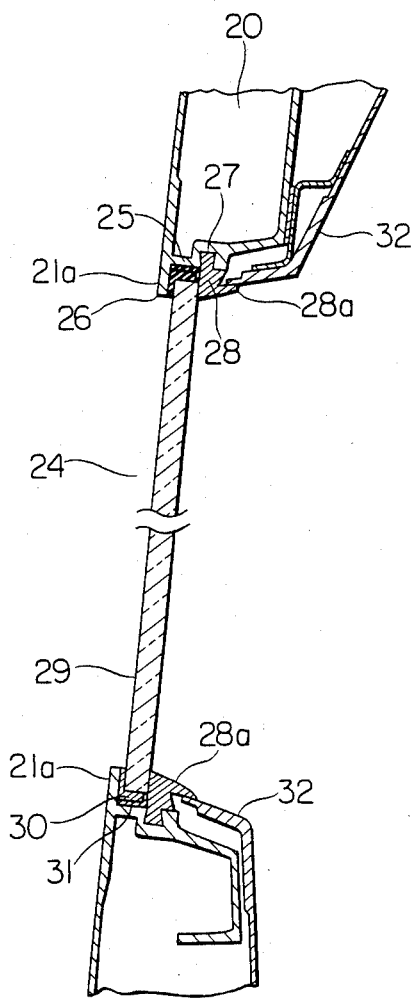
FIG. 2 is an side elevational cross-sectional view taken along the line II—II of FIG. 1.
Figure 3:
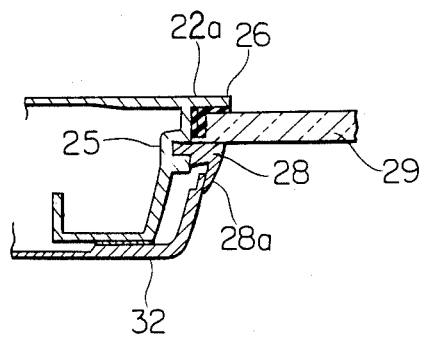
FIG. 3 is a transverse cross-sectional view taken along the line III—III of FIG. 1.
Figure 4:
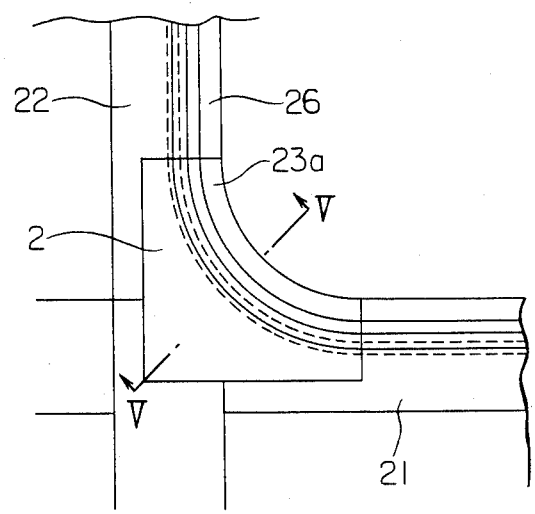
FIG. 4 is an enlarged view of a corner portion shown in FIG. 1.
Figure 5:
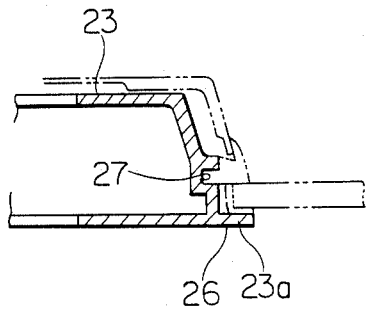
FIG. 5 is a cross-sectional view taken along the line V—V of FIG. 4.

A groove 27 having a bottom surface and two side surfaces, in which the distance between the side surfaces may vary as the distance from the bottom surface increases, is formed over the window opening portion 24 inside of the inner circumferential wall 25. As shown in FIG. 2, the groove is preferably formed such that the distance between the side surfaces decreases as the distance from the bottom surface increases. A glass retainer 28 made of elastic material is fitted in the groove 27. A window glass 29 is fitted in the window opening portion 24 between the glass retainer 28 and the above-described projecting edge 26. A seal rubber 30 is interposed between the inner surface of the projecting edge 26 and the glass 29 and pressingly holds the glass 29.

In addition to the seal rubber 30, an adjusting shim 31 is preferably interposed between the circumferential side edge of the window glass 29 and the inner circumferential wall 25 of the window opening portion 24 confronting the end face of the window glass 29.

A tongue portion 28a extending inwardly of the vehicle body 20 is formed integrally with the glass retainer 28 over the entire circumference of the glass retainer. The tongue portion 28a is in contact with an inner decorative member 32 provided in the vehicle body 20 so as to close the gap between the glass retainer 28 and the decorative member 32.

Figure 6:
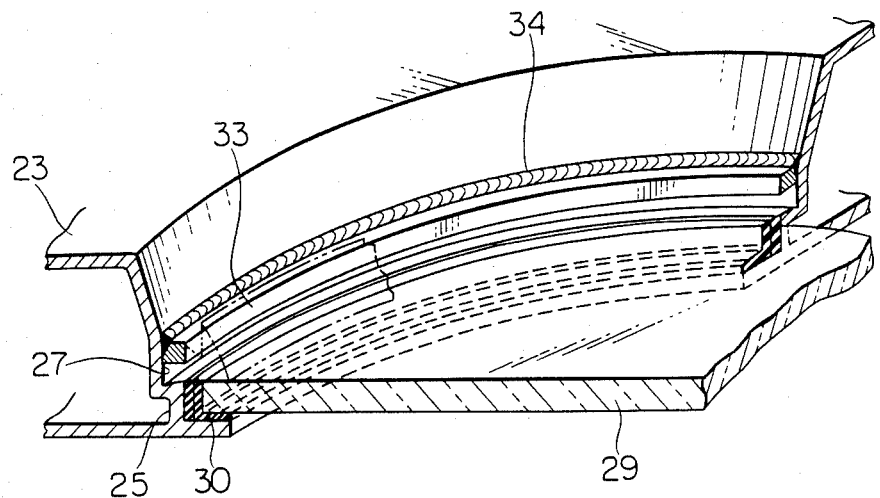
FIG. 6 is a partially fragmentary perspective view of the corner portion shown in FIG. 1.
Figure 7:
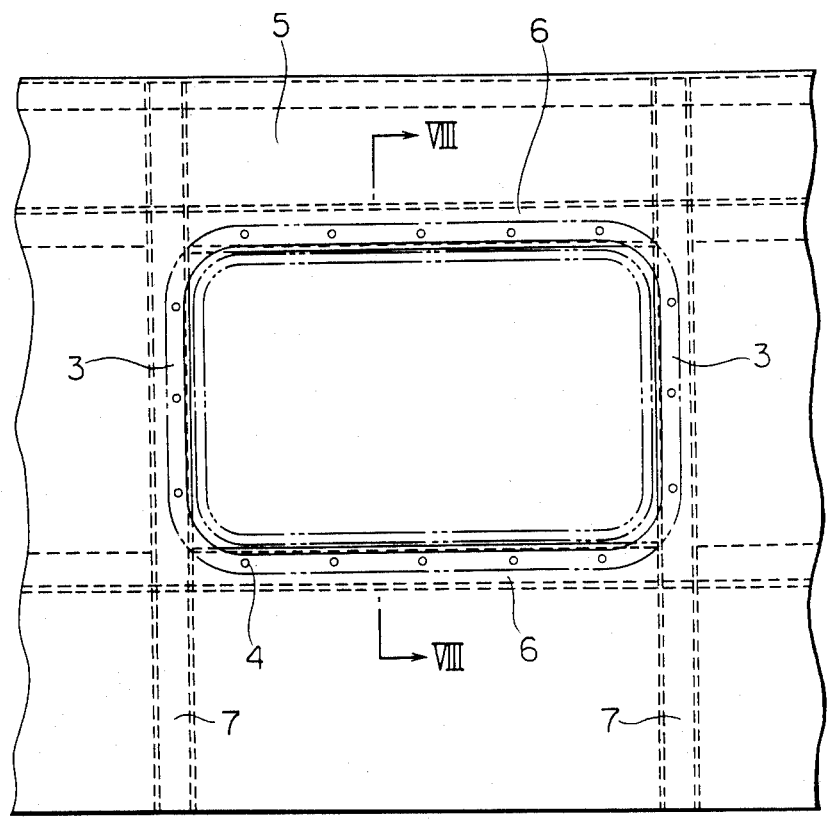
FIG. 7 is an outside view of a window structure according to the prior art.
Figure 10:
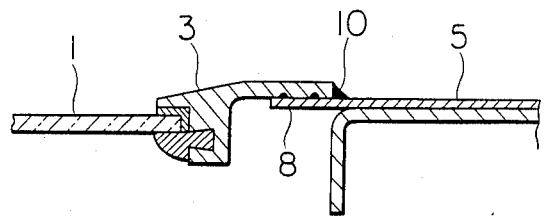
FIG. 10 is a cross-sectional view taken along the line X—X of FIG. 9.
Figure 11:
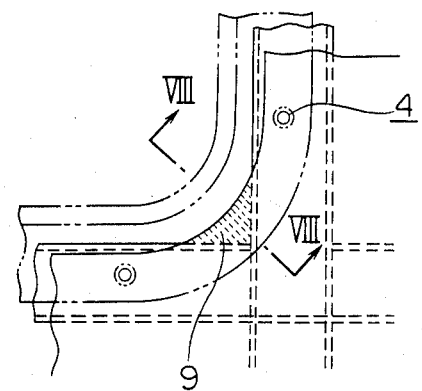
FIG. 11 is an enlarged view similar to FIG. 9.
Figure 12:
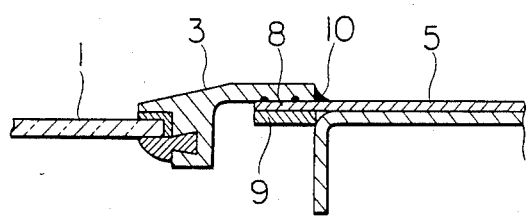
FIG. 12 is a cross-sectional view taken along the line XII—XII of FIG. 11.
Figure 13:
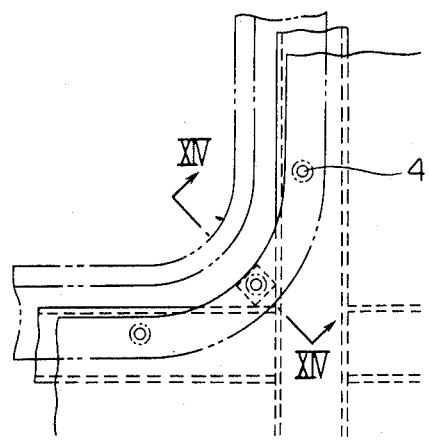
FIG. 13 is an enlarged view similar to FIG. 11.
Figure 14:
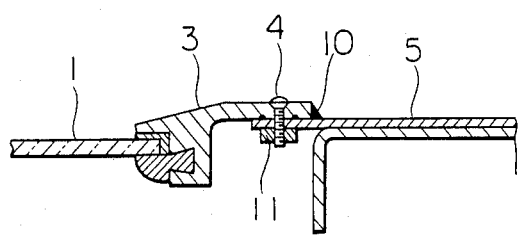
FIG. 14 is a cross-sectional view taken along the line XIV—XIV of FIG. 13.

FIG. 6 shows an example of a structure of the groove 27 for the corner member 23. As described before, a large strain is liable to be applied to the corner portion of the window structure. Therefore, according to the invention, a reinforcing member 33 is welded at position 34 to define the groove 27 by the reinforcing member 33 and the corner member 23.

As described above, according to the window structure of the invention, in the assembling works, the window glass 29 is inserted directly into the window opening portion 24 of the vehicle body 20 from the inside, and simultaneously therewith, the window glass 29 is brought into pressing contact with the projecting edge 26 through the seal rubber 30. Under such a condition, the glass retainer 28 is pressed to the other side surface of the window glass so that the window glass 29 is pressingly held between the glass retainer 28 and the projecting edge 26, thus completing the assembling works of the window structure. According to the present invention, the projecting edge 26 serves as a retainer for the window glass. The groove 27 is formed integrally with the upper and lower frame members 21, the right and left side pillar members 22 and the corner members 23 and it holds the glass retainer 28, which pressingly holds the window glass on the side of the glass opposite the side which is pressed against the projecting edge 26. The projecting edge 26 and the groove 27 reinforce the window opening portion 24 and provide a window structure having rigidity and mechanical strength which sufficiently withstand the various loads transmitted from the vehicle body. In addition, the present invention considerably simplifies the window assembly and structure.

We claim:

1. A window structure for a vehicle comprising:
upper and lower frame members, right and left side pillar members and corner members,
said upper and lower frame members, right and left side pillar members and corner members being formed integrally with a body of said vehicle to define a window opening portion, said window opening portion forming therearound an edge that is integrally projected from the body of said vehicle, said upper and lower frame members, right and left side pillar members and corner members having a substantially continuous circumferential wall surface and at least said frame members and said pillar members shaped to form a groove for receiving a glass retainer, and
a glass applied to said substantially continuous circumferential wall surface and said edge through a seal rubber and an adjustment shim,
said glass being fastened by the glass retainer received in said groove.

2. The window structure of claim 1 wherein one end of said glass retainer is formed in a tongue-like shape so as to close a gap defined between said glass retainer and an interior decorative member provided inside of said body of said vehicle.

3. The window structure of claim 1 wherein said corner members are reinforced by reinforcing members welded to said corner members, said reinforcing members defining a portion of said groove.

4. The window structure of claim 2 wherein said corner members are reinforced by reinforcing members welded to said corner members, said reinforcing members defining a portion of said groove.

5. The window structure according to claim 1 wherein a tongue-like shape extending inwardly of the vehicle body is formed integrally with said glass retainer over the entire circumference of said glass retainer.

6. A window structure for a vehicle comprising:
upper and lower frame members, right and left side pillar members and corner members,
said upper and lower frame members, right and left side pillar members and corner members being formed integrally with a body of said vehicle to define a window opening portion, said window opening portion forming therearound an edge that is integrally projected from the body of said vehicle, said upper and lower frame members, right and left side pillar members and corner members having a substantially continuous circumferential wall surface and at least said frame members and said pillar members shaped to form a groove for receiving a glass retainer,
one end of said glass retainer being formed in a tongue-like shape so as to close a gap defined between said glass retainer and an interior decorative member provided inside of said body of said vehicle, and
a glass applied to said substantially continuous circumferential wall surface and said edge through a seal rubber and an adjustment shim,
said glass being fastened by the glass retainer received in said groove.

7. The window structure of claim 6 wherein said corner members are reinforced by reinforcing members welded to said corner members, said reinforcing members defining a portion of said groove.

8. A window structure for a vehicle, the vehicle having a vehicle body, the window structure comprising:
a window opening portion comprising upper and lower frame members, right and left side pillar members and corner members, said upper and lower frame members, right and left side pillar members and corner members being formed integrally with said vehicle body, having an integrally formed projecting edge, having a substantially continuous circumferential wall surface and at least said frame members and said pillar members shaped to form a groove for receiving a glass retainer,
a glass section positioned adjacent said projecting edge and said circumferential wall surface, and
a glass retainer positioned in said groove,
said glass being secured in place between the glass retainer and the projecting edge.

* * * * *